United States Patent
Cantero Clares et al.

(10) Patent No.: US 12,034,908 B2
(45) Date of Patent: Jul. 9, 2024

(54) STEREOSCOPIC-IMAGE PLAYBACK DEVICE AND METHOD FOR GENERATING STEREOSCOPIC IMAGES

(71) Applicant: Acer Incorporated, New Taipei (TW)

(72) Inventors: Sergio Cantero Clares, New Taipei (TW); Wen-Cheng Hsu, New Taipei (TW); Shih-Hao Lin, New Taipei (TW); Chih-Haw Tan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 141 days.

(21) Appl. No.: 18/054,250

(22) Filed: Nov. 10, 2022

(65) Prior Publication Data

US 2023/0239458 A1 Jul. 27, 2023

(30) Foreign Application Priority Data

Jan. 25, 2022 (TW) .................................. 111103102

(51) Int. Cl.
*H04N 13/398* (2018.01)
*G06T 1/20* (2006.01)
(Continued)

(52) U.S. Cl.
CPC ............ *H04N 13/398* (2018.05); *G06T 1/20* (2013.01); *G06T 7/50* (2017.01); *G06T 17/20* (2013.01);
(Continued)

(58) Field of Classification Search
CPC .. H04N 13/398; H04N 13/128; H04N 13/383; H04N 13/366; H04N 13/302;
(Continued)

(56) References Cited

U.S. PATENT DOCUMENTS 10,885,707 B1 1/2021 Fu et al.
11,454,495 B2 9/2022 Edwin et al.
(Continued)

FOREIGN PATENT DOCUMENTS

CN 113096234 A 7/2021
EP 3 198 866 B1 11/2020
(Continued)

OTHER PUBLICATIONS

Extended European Search Report dated Jun. 12, 2023, issued in application No. EP 22208181.2.
(Continued)

*Primary Examiner* — Tung T Vo
(74) *Attorney, Agent, or Firm* — McClure, Qualey & Rodack, LLP

(57) ABSTRACT

A method for generating stereoscopic images is provided. The method includes: creating a three-dimensional mesh to obtain a stereoscopic scene and capturing a two-dimensional image of the stereoscopic scene; performing image preprocessing to obtain a first image in response to the two-dimensional image not being a side-by-side image; utilizing a graphics processing pipeline to perform depth estimation on the first image to obtain a depth image, to update the three-dimensional mesh according to a depth setting of the depth image, and to map the three-dimensional mesh to a corresponding coordinate system; utilizing the graphics processing pipeline to project the first image onto the mapped three-dimensional mesh to obtain an output three-dimensional mesh, and to capture an output side-by-side image from the output three-dimensional mesh; and utilizing the graphics processing pipeline to weave a left-eye and right-eye image into an output image, and to display the output image.

14 Claims, 4 Drawing Sheets

(51) Int. Cl.
  *G06T 7/50* (2017.01)
  *G06T 17/20* (2006.01)
  *H04N 13/128* (2018.01)
  *H04N 13/383* (2018.01)
(52) U.S. Cl.
  CPC ......... *H04N 13/128* (2018.05); *H04N 13/383* (2018.05)
(58) Field of Classification Search
  CPC .. H04N 13/344; H04N 13/279; H04N 13/139; G06T 1/20; G06T 7/50; G06T 17/20; G06T 15/10
  USPC .......................................................... 348/51
  See application file for complete search history.

(56) References Cited

U.S. PATENT DOCUMENTS

| | | | |
|---|---|---|---|
| 11,538,211 B2* | 12/2022 | Hefny | G06T 7/13 |
| 11,580,697 B2* | 2/2023 | Venshtain | H04N 7/157 |
| 11,683,448 B2* | 6/2023 | Rivard | H04L 65/80 |
| | | | 348/14.07 |
| 11,893,671 B2* | 2/2024 | Sagar | G06T 13/40 |
| 11,908,057 B2* | 2/2024 | Sagar | G06T 13/40 |
| 2015/0042743 A1* | 2/2015 | Cullen | H04N 7/147 |
| | | | 348/14.02 |
| 2021/0272372 A1 | 9/2021 | Heinen et al. | |

FOREIGN PATENT DOCUMENTS

| | | |
|---|---|---|
| TW | 201730627 A | 9/2017 |
| TW | M630947 U | 8/2022 |

OTHER PUBLICATIONS

Chinese language office action dated Apr. 28, 2023, issued in application No. TW 111103102.

Chinese language office action dated Oct. 7, 2022, issued in application No. TW 111103102.

* cited by examiner

STEREOSCOPIC-IMAGE PLAYBACK DEVICE AND METHOD FOR GENERATING STEREOSCOPIC IMAGES

CROSS REFERENCE TO RELATED APPLICATIONS

This Application claims priority of Taiwan Patent Application No. 111103102, filed on Jan. 25, 2022, the entirety of which is incorporated by reference herein.

BACKGROUND OF THE INVENTION

Field of the Invention

The present invention relates to a pointer apparatus, and, in particular, to a stereoscopic-image playback device and a method for generating stereoscopic images for use in the stereoscopic-image playback device.

Description of the Related Art

With the advancements being made in technology, virtual-reality (VR) devices have become increasingly popular. Because a virtual-reality scene requires a huge amount of computation, when the user's position in the virtual-reality scene changes or the line of sight changes, a conventional stereoscopic-image-generating device will often only use the processor (i.e., software) to recalculate the updated virtual-reality scene, and obtain the left-eye image and right-eye image viewed by the user from the updated virtual-reality scene. This calculation method often puts a serious burden on the processor of the stereoscopic-image playback device.

Therefore, there is demand for a stereoscopic-image playback device and a method for generating stereoscopic images to solve the above problem.

BRIEF SUMMARY OF THE INVENTION

In an exemplary embodiment, a stereoscopic-image playback device is provided, which includes a processor and a graphics processing unit. The graphics processing unit creates a three-dimensional mesh and its textures to obtain a stereoscopic scene, and captures a two-dimensional image of the stereoscopic scene. In response to the two-dimensional image not being a side-by-side image, the processor performs image preprocessing on the two-dimensional image to obtain a first image. A graphics processing pipeline of the graphics processing unit performs depth estimation on the first image to obtain a depth image, updates the three-dimensional mesh according to a depth setting of the depth image, and maps the three-dimensional mesh to a corresponding coordinate system according to an eye-tracking result of a user of the stereoscopic-image playback device. The graphics processing pipeline projects the first image onto the mapped three-dimensional mesh to obtain an output three-dimensional mesh, and captures an output side-by-side image from the output three-dimensional mesh, wherein the output side-by-side image comprises a left-eye image and a right-eye image. The graphics processing pipeline weaves the left-eye image and the right-eye image into an output image, and displays the output image on a stereoscopic-image display device.

In some embodiments, in response to the two-dimensional image being the side-by-side image, the graphics processing pipeline directly weaves the left-eye image and the right-eye image of the side-by-side image into the output image, and displays the output image on the stereoscopic-image display device.

In some embodiments, a vertex shader of the graphics processing pipeline projects the first image onto the mapped three-dimensional mesh to obtain the output three-dimensional mesh.

In some embodiments, the image preprocessing adjusts size and format of the two-dimensional image to meet requirements of an artificial-intelligence (AI) model in the graphics processing pipeline, and the AI model performs depth estimation on the first image to obtain the depth image.

In some embodiments, the processor obtains the depth setting by subtracting a minimum depth from a maximum depth of the depth image.

In some embodiments, the stereoscopic-image playback device further includes a camera, configured to capture a facial image of the user, and the processor detects an orientation of the user's eyes from the facial image as the eye-tracking result.

In some embodiments, the graphics processing pipeline uses the depth image as the texture of the three-dimensional mesh to update the three-dimensional mesh.

In another exemplary embodiment, a method for generating stereoscopic images, for use in a stereoscopic-image playback device, is provided. The stereoscopic-image playback device comprises a processor and a graphics processing unit. The method includes the following steps: utilizing the graphics processing unit to create a three-dimensional mesh and its textures to obtain a stereoscopic scene, and to capture a two-dimensional image of the stereoscopic scene; in response to the two-dimensional image not being a side-by-side image, performing image preprocessing on the two-dimensional image to obtain a first image; utilizing a graphics processing pipeline of the graphics processing unit to perform depth estimation on the first image to obtain a depth image, and to update the three-dimensional mesh according to a depth setting of the depth image, and to map the three-dimensional mesh to a corresponding coordinate system according to an eye-tracking result of a user of the stereoscopic-image playback device; utilizing the graphics processing pipeline to project the first image onto the mapped three-dimensional mesh to obtain an output three-dimensional mesh, and to capture an output side-by-side image from the output three-dimensional mesh, wherein the output side-by-side image comprises a left-eye image and a right-eye image; and utilizing the graphics processing pipeline to weave the left-eye image and the right-eye image into an output image, and to display the output image on a stereoscopic-image display device.

In some embodiments, the method further includes the following step: in response to the two-dimensional image being the side-by-side image, utilizing the graphics processing pipeline to directly weave the left-eye image and the right-eye image of the side-by-side image into the output image, and to display the output image on the stereoscopic-image display device.

In some embodiments, the method further includes the following step: utilizing a vertex shader of the graphics processing pipeline to project the first image onto the mapped three-dimensional mesh to obtain the output three-dimensional mesh.

In some embodiments, the image preprocessing adjusts size and format of the two-dimensional image to meet requirements of an artificial-intelligence (AI) model in the graphics processing pipeline, and the AI model performs depth estimation on the first image to obtain the depth image In some embodiments, the method further includes the following step: obtaining the depth setting by subtracting a minimum depth from a maximum depth of the depth image.

In some embodiments, wherein the stereoscopic-image playback device further comprises a camera, configured to capture a facial image of the user, and the method further comprises: utilizing the processor to detect an orientation of the user's eyes from the facial image as the eye-tracking result.

In some embodiments, the method further includes the following step: utilizing the graphics processing pipeline to use the depth image as the texture of the three-dimensional mesh to update the three-dimensional mesh.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

It must be understood that the words "including", "including" and other words used in this specification are used to indicate the existence of specific technical features, values, method steps, operations, elements and/or components, but not It is not excluded that more technical features, values, method steps, job processing, elements, components, or any combination of the above can be added.

Words such as "first", "second", and "third" used in the claims are used to modify the elements in the claims, and are not used to indicate that there is an order of priority, antecedent relationship, or It is an element that precedes another element, or the chronological order of execution of method steps, which is only used to distinguish elements with the same name.

Figure 1:
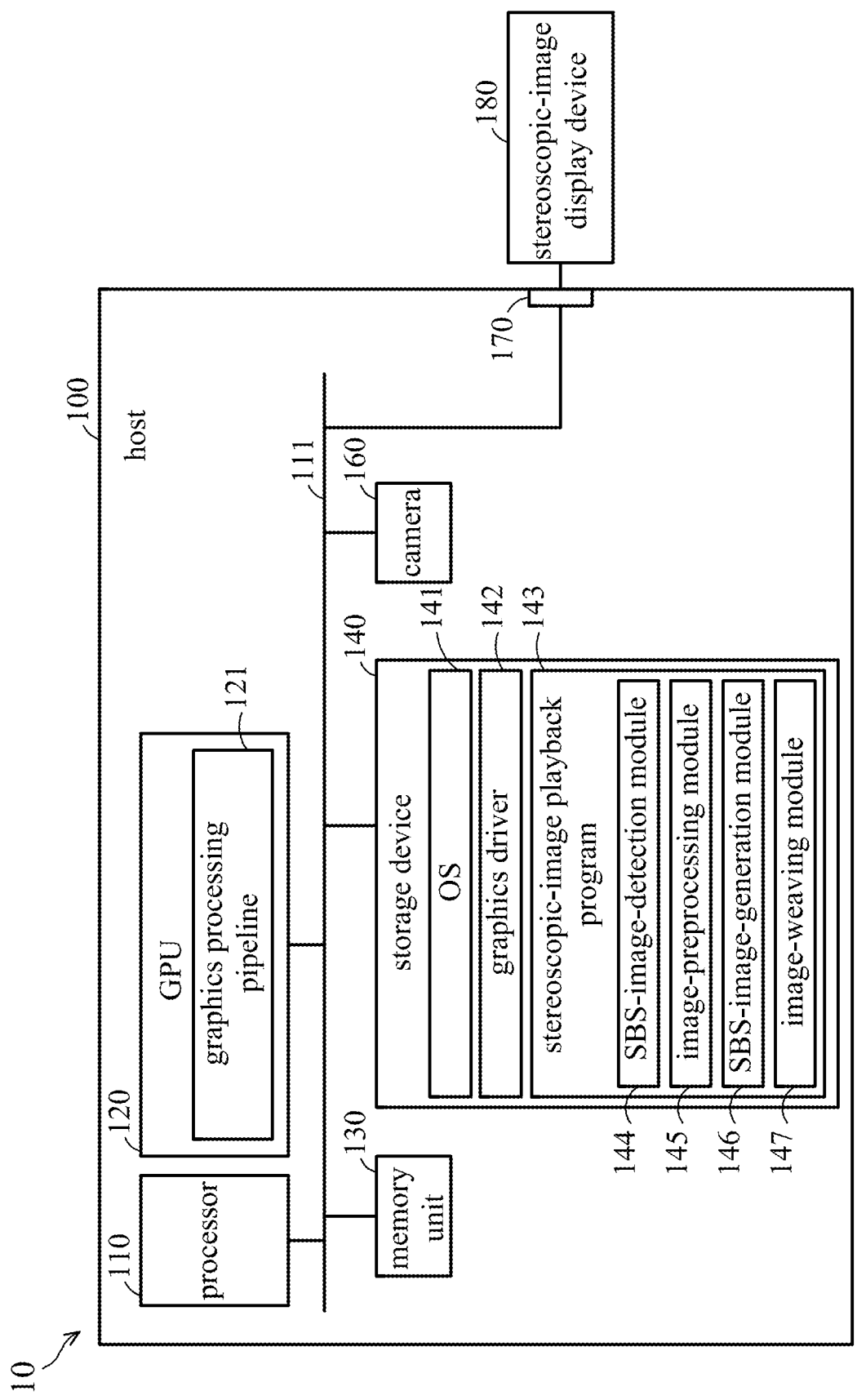
FIG. 1 is a block diagram of stereoscopic-image playback device in accordance with an embodiment of the invention.

FIG. 1 is a block diagram of stereoscopic-image playback device in accordance with an embodiment of the invention.

The stereoscopic-image playback device 10 may be, for example, a personal computer, a server, a portable electronic device, or other electronic devices having similar computation ability. As shown in FIG. 1, the stereoscopic-image playback device 10 may include a host 100 and a stereoscopic-image display device 180. The host 100 is connected to the stereoscopic-image display device 180, and the host 100 may generate an image signal and transmit the image signal to the stereoscopic-image display device 180 for playback. The stereoscopic-image display device 180 may display the image signal from the host 100 using a stereoscopic-image display mode or a planar-image display mode according to the format of the image signal from the host 100.

The host 100 may include a processor 110, a graphics processing unit (GPU) 120, a memory unit 130, a storage device 140, a camera 160, and a transmission interface 170, wherein the components in the host 100 are coupled to each other through the system bus 111.

The processor 110 may be, for example, a central processing unit (CPU), a general-purpose processor, but the invention is not limited thereto. The graphics processing unit 120 may be a graphics processing unit disposed on a video adaptor or a graphics processing unit integrated into the processor 110, but the invention is not limited thereto.

The memory unit 130 may be a random access memory, such as a dynamic random access memory (DRAM) or a static random access memory (SRAM), but the invention is not limited thereto. The memory unit 130 can be regarded as a system memory, which can be used to temporarily storing data for the processor 110, and can be used as an image buffer.

The storage device 140 may be a non-volatile memory, such as a hard disk drive (HDD), a solid-state disk (SSD), a flash memory, or a read-only memory (ROM), but the invention is not limited thereto. For example, the storage device 140 may store an operating system 141 (e.g., Windows, Linux, MacOS, etc.), a graphics driver 142, and a stereoscopic-image playback program 143. The processor 110 may load the operating system 141, the graphics driver 142, and the stereoscopic-image playback program 143 to the memory unit 130 for execution. The graphics processing unit 120 may perform graphics processing of the application executed by the processor 110 to generate an image signal including one or more images, and transmit the image signal to the display apparatus 200 via the transmission interface 170.

The transmission interface 170 may include wired transmission interfaces and/or wireless transmission interfaces. The wired transmission interfaces may include: high definition multimedia interface (HDMI), DisplayPort (DP) interface, embedded DisplayPort (eDP) interface, low-voltage differential signaling (LVDS) interface, Universal Serial Bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, Wi-Fi, near-field communication (NFC) interface, etc., but the invention is not limited thereto.

The camera 160 may be disposed on the stereoscopic-image playback device 10 (or the stereoscopic-image display device 180), and may capture the facial image of the user in front of the stereoscopic-image playback device 10. In addition, the processor 110 may execute an eye-tracking program (not shown) which may detect the orientation of the line of sight of user's eyes from the facial image as the eye-tracking result. The eye-tracking result can be used in the side-by-side (SBS) image generating phase in the stereoscopic-image playback program, the details of which will be described later.

The stereoscopic-image display device 180, for example, may be a head-mounted display (HMD) or an autostereoscopic display device that is configured to display virtual-reality images or stereoscopic images. The stereoscopic-image display device 180 may be implemented by different stereoscopic display technologies. For example, the autostereoscopic display technologies may include parallax barriers, lenticular lenses, directional backlight, etc., which are capable of alternatively or simultaneously display the left-eye image and the right-eye image of the stereoscopic image. The head-mounted display may include a left-eye display panel and a right-eye display panel, which are used to respectively display the left-eye image and right-eye image of the stereoscopic image, and displayed left-eye image and right-eye image are imaged on the user's left eye and right eye after passing through the corresponding left-eye lens and right-eye lens, thereby generating stereoscopic vision. One having ordinary skill in the art will appreciate that the relevant playback mechanism of the head-mounted displays and stereoscopic display devices, so the details will be omitted here.

The stereoscopic-image playback program 143 may include a side-by-side (SBS) image detection module 144, an image-preprocessing module 145, a SBS-image generation module 146, and an image-weaving module 147. The SBS-image detection module 144 is configured to detect whether the received planar image is a side-by-side image, wherein the side-by-side image refers to an image including a left-eye image and a right-eye image that are arranged side by side. The image-preprocessing module 145 is configured to perform size adjustment and/or format conversion on the received planar image, and the size and/or format of the processed planar image conform to the requirements for depth estimation by an artificial-intelligence (AI) model that is executed by the stereoscopic-image playback program 143 and the graphics processing unit 120.

The SBS-image generation module 146 may uses the three-dimensional mesh according to the depth setting, and perform coordinate mapping according to the eye-tracking result to generate the side-by-side image, the details of which will be described later.

Figure 2:
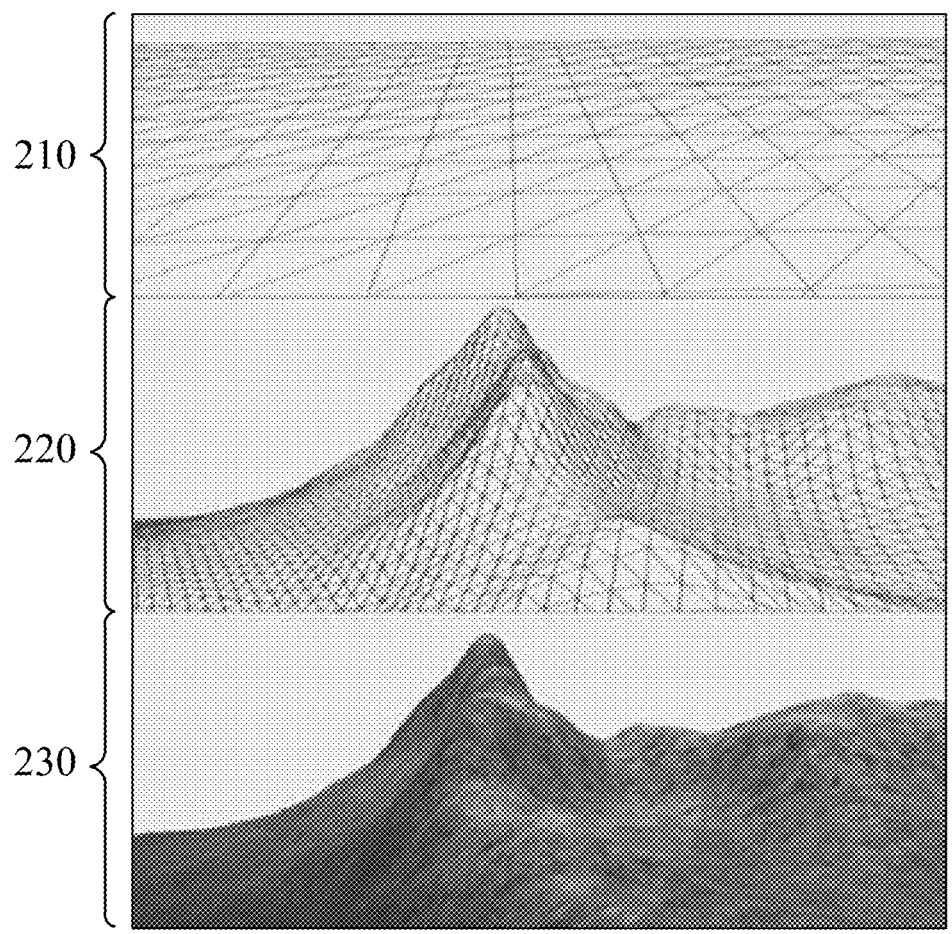
FIG. 2 is a diagram of a planar image, a three-dimensional mesh, and a two-dimensional mesh in accordance with an embodiment of the invention.

FIG. 2 is a diagram of a planar image, a three-dimensional mesh, and a two-dimensional mesh in accordance with an embodiment of the invention.

FIG. 2 includes regions 210, 220, and 230, wherein region 210 is a schematic diagram of a two-dimensional mesh, region 220 is a schematic diagram of a three-dimensional mesh, and region 230 is a schematic diagram of a three-dimensional scene. For example, the two-dimensional mesh in region 210 includes a plurality of triangles arranged in sequence on the X-Y plane, and each triangle has a set of vertices. The graphics processing pipeline 121 in the graphics processing unit 120 will first generate a two-dimensional mesh corresponding to the three-dimensional scene, and assign the vertices of each triangle in the two-dimensional mesh a specific height (i.e., in the Z-axis direction) to obtain the three-dimensional mesh shown in region 220, wherein the Z-axis direction represents the depth of the scene. Finally, the graphics processing pipeline 121 pastes the corresponding materials of each triangle to obtain the three-dimensional scene shown in region 230.

Figure 3:
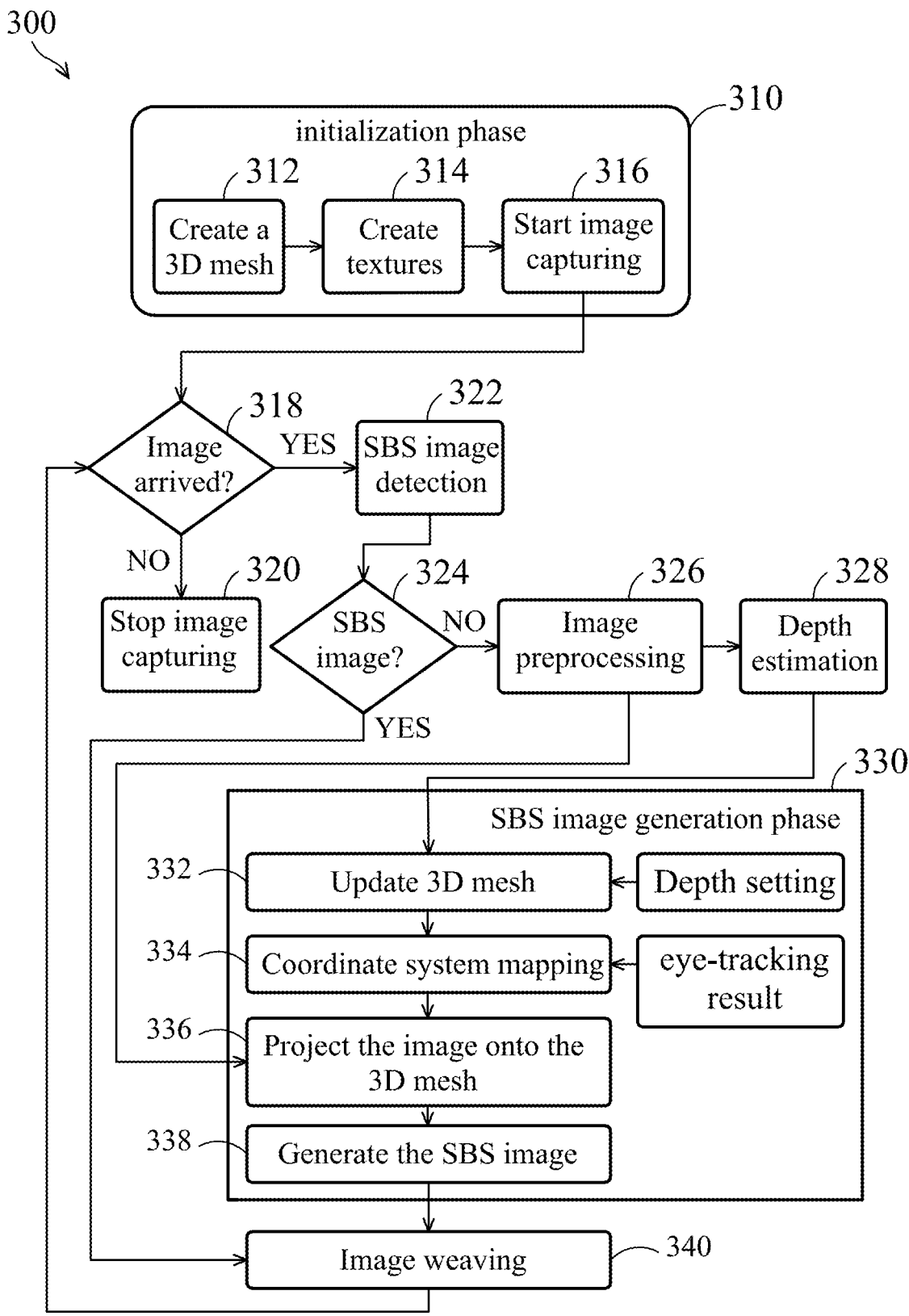
FIG. 3 is a diagram illustrating a flow of a method for generating a stereoscopic image using a graphics processing pipeline in accordance with an embodiment of the invention.

FIG. 3 is a diagram illustrating a flow of a method for generating a stereoscopic image using a graphics processing pipeline in accordance with an embodiment of the invention. Please refer to FIG. 1 and FIG. 3.

Process 300 begins with initialization phase 310, which includes blocks 312, 314, and 316. Block 312: Create a three-dimensional (3D) mesh. For example, when the graphics processing pipeline 121 of the graphics processing unit 120 performs graphics processing, it will first create a three-dimensional mesh corresponding to the three-dimensional scene, as shown in region 220 of FIG. 2.

Block 314: Create textures. For example, the three-dimensional mesh may include a plurality of triangles, and each triangle has a corresponding texture. The graphics processing pipeline will create the texture corresponding to each triangle together. When performing graphics processing, the vertex shader of the graphics processing pipeline 121 pastes the texture of each triangle to obtain the three-dimensional scene.

Block 316: Start image capturing. For example, although the graphics processing unit 120 has generated a three-dimensional scene, the host 100 still needs to generate a corresponding image before it can be played on the stereoscopic-image display device 180. At this time, the processor 110 can perform image capturing on the three-dimensional scene to obtain a planar image (i.e., two-dimensional image) of the three-dimensional scene.

Block 318: Determine whether the image has arrived. For example, in the process of FIG. 3, if the stereoscopic image can be successfully generated at block 340, then block 318 determines that the image has arrived. If the stereoscopic image is not successfully generated at block 340, block 318 determines that the image has not arrived, so block 320 is performed to stop image capturing.

Block 322: Side-by-side image detection. Block 324: Determine whether it is a SBS image? For example, the SBS-image detection module 144 is configured detect whether the two-dimensional image generated by the graphics processing unit 120 is a side-by-side image, wherein the side-by-side image refers to an image including a left-eye image and a right-eye image that are arranged side by side. If it is detected that the two-dimensional image is a side-by-side image in block 324, block 340 is performed. If it is detected that the two-dimensional image is not a side-by-side image in block 324, block 326 is performed.

Block 326: Image preprocessing. For example, the image-preprocessing module 145 is configured to perform size adjustment and/or format conversion on the received planar image, and the size and/or format of the processed planar image conform to the requirements for depth estimation by an artificial-intelligence (AI) model that is executed by the stereoscopic-image playback program 143 and the graphics processing unit 120. It should be noted that when the aforementioned AI model performs depth estimation on its input image, the format and/or size (e.g., resolution) of the input image must meet the requirements of the AI model.

Block 328: Depth estimation. For example, the AI model executed by the graphics processing unit 120 has been trained in advance, and it obtains a single input image (i.e., a planar image) to determine the corresponding depth of objects in the input image. Thus, the graphics processing unit 120 can obtain the depth setting of the planar image, wherein the depth setting may be, for example, a depth-effect-strength parameter, which may be the maximum depth minus the minimum depth of the planar image in the Z-axis direction. In an embodiment, the depth estimation of the present invention can be performed on each frame, that is, a depth map corresponding to each input image will be generated by the AI model.

The SBS-image-generation phase 330 includes blocks 332, 334, 336, and 338. Block 332: Update the three-dimensional mesh. For example, the graphics processing pipeline 121 of the graphics processing unit 120 may update the three-dimensional mesh according to the depth setting of the planar image, wherein the vertex shader of the graphics processing pipeline 121 may use the depth map or depth image obtained in block 328 as the texture of the corresponding triangle in the three-dimensional mesh. In an embodiment, the user can dynamically adjust the depth setting. For example, if the depth of the display plane is 0, and the depth value in the direction of the display screen is at most −10. The user may set the depth from 0 to −6 according to his or her own needs, and the maximum depth value will be −6. In another embodiment, the user can set the range of the depth value to be −3 to −9. Accordingly, the graphics processing pipeline 121 can update the three-dimensional mesh according to the depth setting of the two-dimensional mesh.

Block 334: Coordinate system mapping. For example, the graphics processing unit 120 may perform coordinate mapping on the three-dimensional mesh according to the eye-tracking result. When the user wears the head-mounted display or watches the stereoscopic display device, the user may adjust the position of the body or head, or adjust the line of sight of eyeballs, and these actions will affect computation of the three-dimensional image in the virtual-reality scene (i.e., three-dimensional scene) viewed by the user. For example, when the user performs the aforementioned actions, it can be considered that the positions of the left camera and the right camera (i.e., corresponding to the user's left eye and right eye) in the virtual-reality scene also change, so the graphics processing unit 120 has to recalculate the left-side image and right-side image in the virtual-reality scene captured by the changed positions of the left camera and right camera as the left-eye image and right-eye image viewed by the user.

Block 336: Project the image onto the three-dimensional mesh. For example, through blocks 332 and 334, the relative position and distance (or depth) of the user's eye in the three-dimensional mesh after the updating and mapping operations can be determined, so the graphics processing pipeline 121 can project the planar image onto the three-dimensional mesh to obtain the updated virtual-reality scene.

Block 338: Generate side-by-side images. Since the updated virtual-reality scene has been obtained at block 336, the processor 110 (or the graphics processing unit 120) can use the left camera and the right camera in the updated virtual-reality scene to capture images at this time to obtain the left-eye image and the right-eye image, and arrange the left-eye image and the right-eye image side by side to obtain the side-by-side image.

Block 340: Image-weaving processing. For example, for some stereoscopic image-display device (e.g., autostereoscopic display device), it is necessary to play the left-eye image and the right-eye image at the same time, so that the user can experience the stereoscopic vision. The input image format of such as stereoscopic-image display device needs to be a weaved image, for example, the odd-numbered lines are the left-eye image and the even-numbered lines are the right-eye image, or the odd-numbered lines are the right-eye image and the even-numbered lines are the left-eye image.

In the present invention, since the graphics processing pipeline 121 of the graphics processing unit 120 is a dedicated hardware circuit, when the user's position or line of sight in the virtual-reality scene changes, the graphics processing pipeline 121 can quickly update the three-dimensional mesh and calculate the coordinate system after mapping, and can paste the two-dimensional image onto the mapped three-dimensional mesh to obtain the updated stereoscopic scene. Accordingly, the present invention can utilize the graphics processing pipeline 121 of the graphics processing unit 120 to quickly calculate left-side image and right-side image of the virtual-reality scene captured by the left camera and right camera at the changed positions, and to generate the corresponding side-by-side image and weaved images for playback by the stereoscopic-image display device 180. In an embodiment, the graphics processing pipeline 121 of the graphics processing 120 can simultaneously store each image and its corresponding depth map. Accordingly, the processing speed will be very fast by processing each captured frame and its depth map in the same graphics processing pipeline 121.

Figure 4:
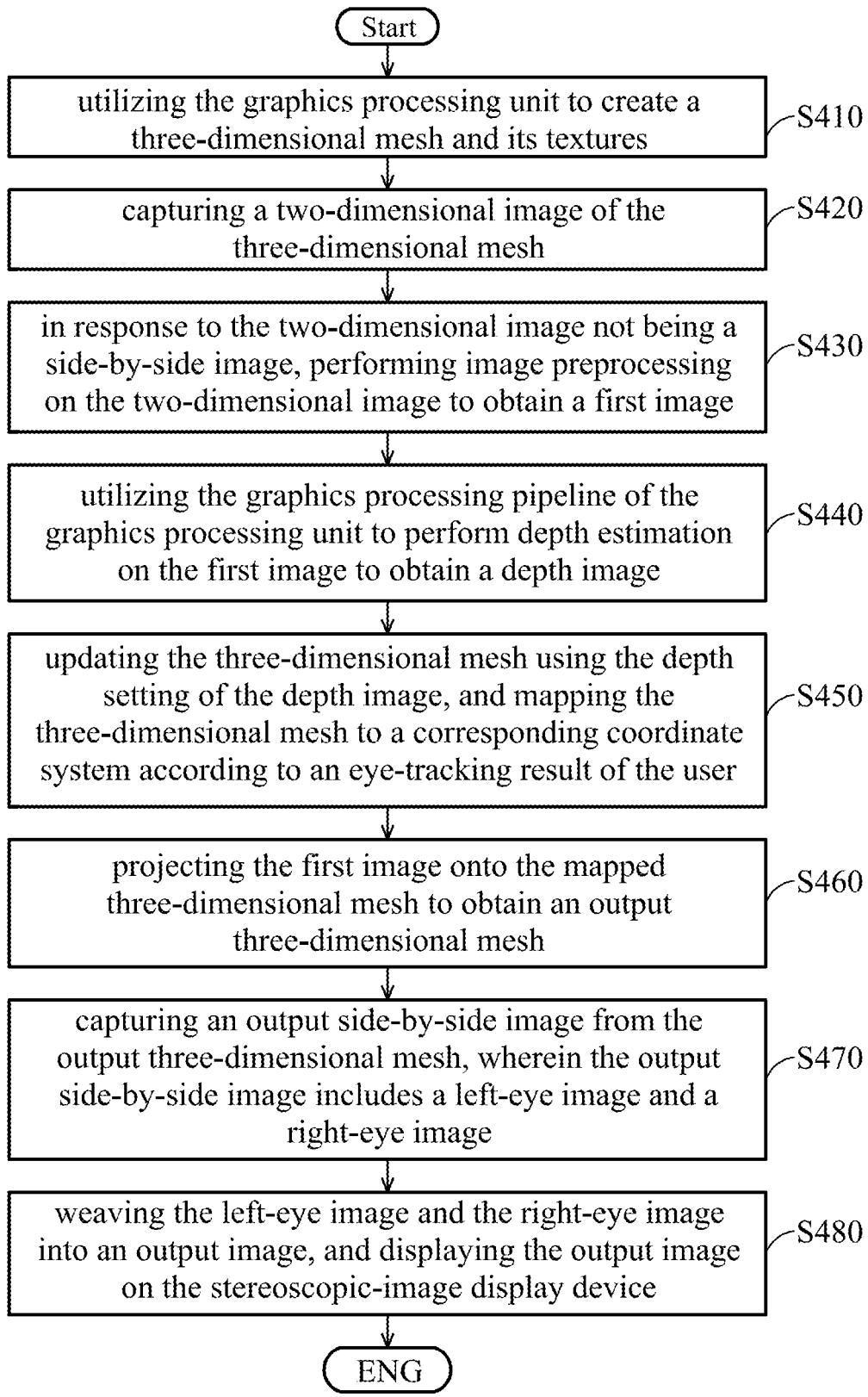
FIG. 4 is a flow chart of a method for generating stereoscopic images in accordance with an embodiment of the invention.

FIG. 4 is a flow chart of a method for generating stereoscopic images in accordance with an embodiment of the invention. Please refer to FIG. 1, FIG. 3, and FIG. 4.

Step S410: Utilizing the graphics processing unit to create a three-dimensional mesh and its textures. For example, the three-dimensional mesh may include a plurality of triangles, and each triangle has a corresponding texture. The graphics processing pipeline will create the texture corresponding to each triangle together. When performing graphics processing, the vertex shader of the graphics processing pipeline 121 pastes the texture of each triangle to obtain the three-dimensional scene.

Step S420: Capturing a two-dimensional image of the three-dimensional mesh. For example, although the graphics processing unit 120 has generated a three-dimensional scene, the host 100 still needs to generate a corresponding image before it can be played on the stereoscopic-image display device 180. At this time, the processor 110 can perform image capturing on the three-dimensional scene to obtain a planar image (i.e., two-dimensional image) of the three-dimensional scene.

Step S430: In response to the two-dimensional image not being a side-by-side image, performing image preprocessing on the two-dimensional image to obtain a first image. For example, the image-preprocessing module 145 is configured to perform size adjustment and/or format conversion on the received planar image, and the size and/or format of the processed planar image conform to the requirements for depth estimation by an artificial-intelligence (AI) model that is performed by the stereoscopic-image playback program 143 and the graphics processing unit 120. It should be noted that when the aforementioned AI model performs depth estimation on its input image, the format and/or size (e.g., resolution) of the input image must meet the requirements of the AI model.

Step S440: Utilizing the graphics processing pipeline of the graphics processing unit to perform depth estimation on the first image to obtain a depth image. For example, the AI model executed by the graphics processing unit 120 has been trained in advance, and it obtains a single input image (i.e., a planar image) to determine the corresponding depth of objects in the input image. Thus, the graphics processing unit 120 can obtain the depth setting of the planar image, wherein the depth setting may be, for example, a depth-effect-strength parameter, which may be the maximum depth minus the minimum depth of the planar image in the Z-axis direction. In addition, the graphics processing unit 120 will determine the depth map corresponding to each input image.

Step S450: Updating the three-dimensional mesh using the depth setting of the depth image, and mapping the three-dimensional mesh to a corresponding coordinate system according to an eye-tracking result of the user. For example, the graphics processing unit 120 may perform coordinate mapping on the three-dimensional mesh according to the eye-tracking result. When the user wears the head-mounted display or watches the stereoscopic display device, the user may adjust the position of the body or head, or adjust the line of sight of eyeballs, and these actions will affect computation of the three-dimensional image in the virtual-reality scene (i.e., three-dimensional scene) viewed by the user. For example, when the user performs the aforementioned actions, it can be considered that the positions of the left camera and the right camera (i.e., corresponding to the user's left eye and right eye) in the virtual-reality scene also change, so the graphics processing unit 120 has to recalculate the left-side image and right-side image in the virtual-reality scene captured by the changed positions of the left camera and right camera as the left-eye image and right-eye image viewed by the user.

Step S460: Projecting the first image onto the mapped three-dimensional mesh to obtain an output three-dimensional mesh. For example, through steps S440 and S450, the relative position and distance (or depth) of the user's eye in the three-dimensional mesh after the updating and mapping operations can be determined, so the graphics processing pipeline 121 can project the planar image onto the three-dimensional mesh to obtain the updated virtual-reality scene.

Step S470: Capturing an output side-by-side image from the output three-dimensional mesh, wherein the output side-by-side image includes a left-eye image and a right-eye image. Since the updated virtual-reality scene has been obtained at step S460, the processor 110 (or the graphics processing unit 120) can use the left camera and the right camera in the updated virtual-reality scene to capture images at this time to obtain the left-eye image and the right-eye image, and arrange the left-eye image and the right-eye image side by side to obtain the side-by-side image.

Step S480: Weaving the left-eye image and the right-eye image into an output image, and displaying the output image on the stereoscopic-image display device. For example, for some stereoscopic image-display device (e.g., autostereoscopic display device), it is necessary to play the left-eye image and the right-eye image at the same time, so that the user can experience the stereoscopic vision. The input image format of such as stereoscopic-image display device needs to be a weaved image, for example, the odd-numbered lines are the left-eye image and the even-numbered lines are the right-eye image, or the odd-numbered lines are the right-eye image and the even-numbered lines are the left-eye image.

In view of the above, a stereoscopic-image playback device and a method for generating stereoscopic images are provided, which are capable of utilizing the AI model of the graphics processing pipeline of the graphics processing unit to quickly determine the depth of each object in a two-dimensional image, and the graphics processing pipeline can quickly update the three-dimensional mesh and calculate the coordinate system after mapping, and can paste the two-dimensional image onto the mapped three-dimensional mesh to obtain the updated stereoscopic scene. Accordingly, when the user's position or line of sight in the virtual-reality scene changes, the present invention can utilize the graphics processing pipeline of the graphics processing unit to quickly calculate left-side image and right-side image of the virtual-reality scene captured by the left camera and right camera at the changed positions, and to generate the corresponding side-by-side image and weaved images for playback by the stereoscopic-image display device, thereby improving the image quality of the output stereoscopic image and increasing the computation speed when playing the stereoscopic images. Compared with the traditional pixel offset method which performs pixel offset on the original image according to the depth-map information to obtain the other-eye image, the present invention can quickly calculate the other-eye image through the three-dimensional mesh according to the user's need and position movement without additional calculations.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A stereoscopic-image playback device, comprising:
a processor; and
a graphics processing unit, configured to create a three-dimensional mesh and its textures to obtain a stereoscopic scene, and to capture a two-dimensional image of the stereoscopic scene;
wherein in response to the two-dimensional image not being a side-by-side image, the processor performs image preprocessing on the two-dimensional image to obtain a first image;
wherein a graphics processing pipeline of the graphics processing unit performs depth estimation on the first image to obtain a depth image, updates the three-dimensional mesh according to a depth setting of the depth image, and maps the three-dimensional mesh to a corresponding coordinate system according to an eye-tracking result of a user of the stereoscopic-image playback device;
wherein the graphics processing pipeline projects the first image onto the mapped three-dimensional mesh to obtain an output three-dimensional mesh, and captures an output side-by-side image from the output three-dimensional mesh, wherein the output side-by-side image comprises a left-eye image and a right-eye image;
wherein the graphics processing pipeline weaves the left-eye image and the right-eye image into an output image, and displays the output image on a stereoscopic-image display device.

2. The stereoscopic-image playback device as claimed in claim 1, wherein in response to the two-dimensional image being the side-by-side image, the graphics processing pipeline directly weaves the left-eye image and the right-eye image of the side-by-side image into the output image, and displays the output image on the stereoscopic-image display device.

3. The stereoscopic-image playback device as claimed in claim 1, wherein a vertex shader of the graphics processing pipeline projects the first image onto the mapped three-dimensional mesh to obtain the output three-dimensional mesh.

4. The stereoscopic-image playback device as claimed in claim 1, wherein the image preprocessing adjusts size and format of the two-dimensional image to meet requirements of an artificial-intelligence (AI) model in the graphics processing pipeline, and the AI model performs depth estimation on the first image to obtain the depth image.

5. The stereoscopic-image playback device as claimed in claim 1, wherein the processor obtains the depth setting by subtracting a minimum depth from a maximum depth of the depth image.

6. The stereoscopic-image playback device as claimed in claim 1, further comprising: a camera, configured to capture a facial image of the user, and the processor detects an orientation of the user's eyes from the facial image as the eye-tracking result.

7. The stereoscopic-image playback device as claimed in claim 1, wherein the graphics processing pipeline uses the depth image as the texture of the three-dimensional mesh to update the three-dimensional mesh.

8. A method for generating stereoscopic images, for use in a stereoscopic-image playback device, wherein the stereoscopic-image playback device comprises a processor and a graphics processing unit, the method comprising:
   utilizing the graphics processing unit to create a three-dimensional mesh and its textures to obtain a stereoscopic scene, and to capture a two-dimensional image of the stereoscopic scene;
   in response to the two-dimensional image not being a side-by-side image, performing image preprocessing on the two-dimensional image to obtain a first image;
   utilizing a graphics processing pipeline of the graphics processing unit to perform depth estimation on the first image to obtain a depth image, and to update the three-dimensional mesh according to a depth setting of the depth image, and to map the three-dimensional mesh to a corresponding coordinate system according to an eye-tracking result of a user of the stereoscopic-image playback device;
   utilizing the graphics processing pipeline to project the first image onto the mapped three-dimensional mesh to obtain an output three-dimensional mesh, and to capture an output side-by-side image from the output three-dimensional mesh, wherein the output side-by-side image comprises a left-eye image and a right-eye image; and
   utilizing the graphics processing pipeline to weave the left-eye image and the right-eye image into an output image, and to display the output image on a stereoscopic-image display device.

9. The method as claimed in claim 8, further comprising:
   in response to the two-dimensional image being the side-by-side image, utilizing the graphics processing pipeline to directly weave the left-eye image and the right-eye image of the side-by-side image into the output image, and to display the output image on the stereoscopic-image display device.

10. The method as claimed in claim 8, further comprising:
    utilizing a vertex shader of the graphics processing pipeline to project the first image onto the mapped three-dimensional mesh to obtain the output three-dimensional mesh.

11. The method as claimed in claim 8, wherein the image preprocessing adjusts size and format of the two-dimensional image to meet requirements of an artificial-intelligence (AI) model in the graphics processing pipeline, and the AI model performs depth estimation on the first image to obtain the depth image.

12. The method as claimed in claim 8, further comprising:
    obtaining the depth setting by subtracting a minimum depth from a maximum depth of the depth image.

13. The method as claimed in claim 8, wherein the stereoscopic-image playback device further comprises a camera, configured to capture a facial image of the user, and the method further comprises:
    utilizing the processor to detect an orientation of the user's eyes from the facial image as the eye-tracking result.

14. The method as claimed in claim 8, further comprising:
    utilizing the graphics processing pipeline to use the depth image as the texture of the three-dimensional mesh to update the three-dimensional mesh.

\* \* \* \* \*